United States Patent [19]

Keck

[11] Patent Number: 5,777,409

[45] Date of Patent: Jul. 7, 1998

[54] METHODS AND APPARATUS FOR COUPLING AN ELECTRIC MOTOR AND A MOTOR LEAD PROTECTIVE CONDUIT

[75] Inventor: Arthur Carl Keck, Fort Wayne, Ind.

[73] Assignee: General Electric Company, Fort Wayne, Ind.

[21] Appl. No.: 600,900

[22] Filed: Feb. 13, 1996

[51] Int. Cl.$^6$ .................................................. H02K 11/00
[52] U.S. Cl. .............................. 310/71; 310/87; 310/88; 310/89; 310/90
[58] Field of Search .............................. 310/71, 87, 90, 310/88, 89

[56] References Cited

U.S. PATENT DOCUMENTS

| | | | |
|---|---|---|---|
| 1,775,128 | 9/1930 | Hunter | 176/6 J |
| 1,830,276 | 11/1931 | Hunter | 174/65 |
| 2,004,866 | 6/1935 | Haldeman | 103/87 |
| 3,283,186 | 11/1966 | Perry | 310/71 |
| 3,324,228 | 6/1967 | Larsson | 174/65 |
| 3,384,393 | 5/1968 | Horton et al. | 310/71 |
| 3,482,128 | 12/1969 | Keck et al. | 310/71 |
| 3,502,917 | 3/1970 | Bizoe | 310/71 |
| 3,544,705 | 12/1970 | Winston | 174/75 |
| 3,814,961 | 6/1974 | Nelson et al. | 310/87 |
| 3,895,177 | 7/1975 | Muslin | 174/48 |
| 3,992,044 | 11/1976 | Muslin | 285/92 |
| 4,101,794 | 7/1978 | Miller et al. | 310/71 |
| 4,103,101 | 7/1978 | Maier | 174/65 R |
| 4,232,712 | 11/1980 | Squires | 138/109 |
| 4,248,459 | 2/1981 | Pate et al. | 285/319 |
| 4,302,035 | 11/1981 | Ochwat | 285/158 |
| 4,494,779 | 1/1985 | Neff et al. | 285/159 |
| 4,523,117 | 6/1985 | Daniels | 310/71 |
| 4,616,105 | 10/1986 | Borsh | 174/65 R |
| 4,626,720 | 12/1986 | Fukasaku et al. | 310/62 |
| 4,711,974 | 12/1987 | Borsh | 174/65 R |
| 4,781,726 | 11/1988 | Fisher et al. | 29/596 |
| 4,851,725 | 7/1989 | Keck | 310/71 |
| 4,864,080 | 9/1989 | Fochler et al. | 174/65 R |
| 4,897,571 | 1/1990 | Isozumi | 310/239 |
| 4,965,478 | 10/1990 | Kobayashi et al. | 310/249 |
| 5,086,243 | 2/1992 | Hofmann | 310/71 |
| 5,086,244 | 2/1992 | Isozumi | 310/89 |
| 5,148,073 | 9/1992 | Tamura | 310/239 |
| 5,189,258 | 2/1993 | Pratesi | 174/65 R |
| 5,192,888 | 3/1993 | Fleer | 310/71 |
| 5,246,816 | 11/1993 | Degenhart et al. | 336/192 |
| 5,350,960 | 9/1994 | Kiri et al. | 310/194 |
| 5,519,273 | 5/1996 | Keck | 310/71 |

FOREIGN PATENT DOCUMENTS

| | | | |
|---|---|---|---|
| 1125027 | 3/1962 | Germany | 310/71 |
| 55-125051 | 9/1980 | Japan | 310/71 |
| 56-41746 | 4/1981 | Japan | 310/71 |
| 200456 | 12/1965 | Sweden | 310/71 |
| 1422282 | 9/1988 | U.S.S.R. | 310/71 |

OTHER PUBLICATIONS

Carflex Liquid Flexible Nonmetallic Conduit –X–Flex Extra Flexible Nonmetallic Tubing Liquidtight Nonmetallic Fittings, Specifications printed by Carlon, 1993.
U.S. Serial No. 08/302,609 filed Sep. 8, 1994 for *Fitting For Coupling An Electric Motor And A Motor Lead Protective Conduit*; allowed Nov. 16, 1995; anticipated to issue May 21, 1996 as U.S. Patent No. 5,519,273.

*Primary Examiner*—Steven L. Stephan
*Assistant Examiner*—Elvin G. Enad
*Attorney, Agent, or Firm*—Enrique J. Mora

[57] ABSTRACT

Methods and apparatus for coupling a conduit to an electric motor by way of a moisture resistant two-piece connector, are described. The two-piece connector includes, in one embodiment, a boss sized to be at least partially located in an end portion of a plastic, non-metallic conduit and a protective cover that substantially covers the motor shell notch at least between the boss and the motor shell notch edges. More specifically, in the one embodiment, the two-piece connector includes first and second connector members having protective cover portions and boss portions extending from the protective cover portions. The first and second connecter members further include notch interfitting portions having engagement surfaces for contacting edge surfaces of the motor housing at an outer periphery of the notch.

42 Claims, 1 Drawing Sheet

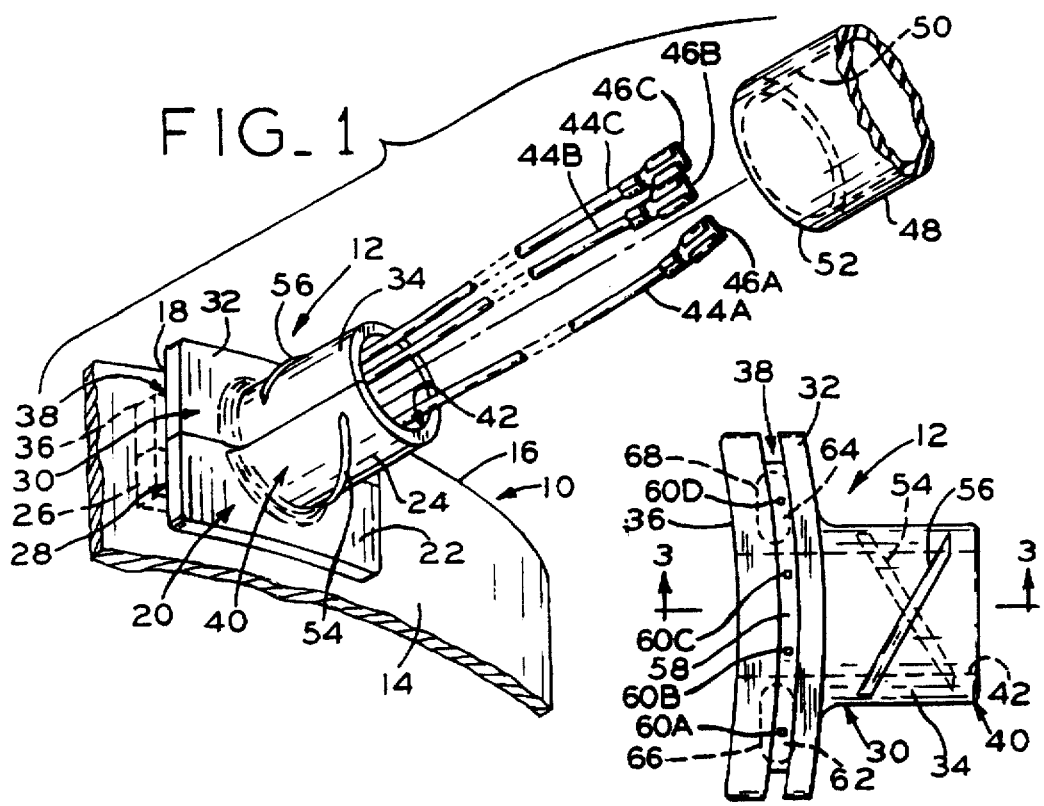
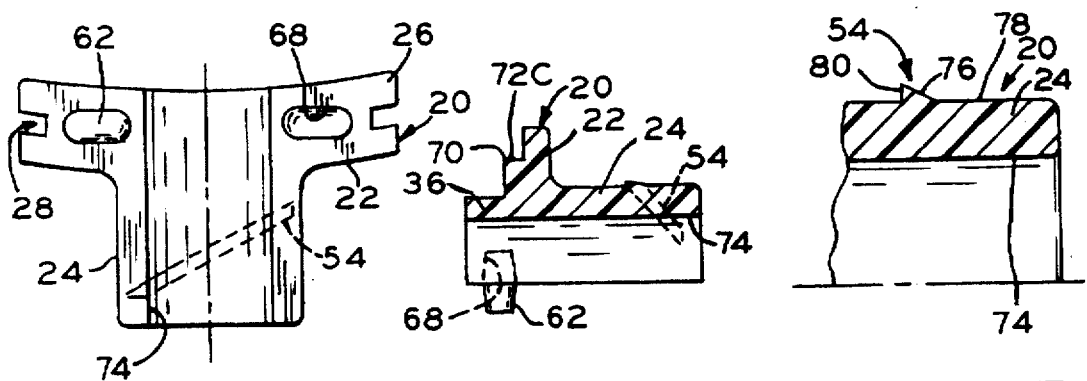
FIG._1  FIG._2  FIG._3  FIG._4  FIG._5  FIG._6  FIG._7

METHODS AND APPARATUS FOR COUPLING AN ELECTRIC MOTOR AND A MOTOR LEAD PROTECTIVE CONDUIT

FIELD OF THE INVENTION

This invention relates generally to electric motors and, more particularly, to methods and apparatus for coupling, to an electric motor housing, a plastic conduit or sheath for protecting motor leads from exposure to water, oil and dirt.

BACKGROUND OF THE INVENTION

Dynamoelectric machines such as small electric motors typically include a stator assembly having one or more windings and a rotor assembly rotatably mounted and extending through a bore formed in the stator assembly. In a typical configuration, the stator and rotor assemblies are located in a motor housing formed by a motor shell and motor endshields that close respective ends of the motor shell. Such an electric motor is described, for example, in Keck et al., U.S. Pat. No. 3,482,128, which is assigned to the present assignee.

In an outdoor application, e.g., outdoor air conditioning condensing units and heat pumps, motor leads typically are electrically connected at one end to the stator windings and the motor leads extend through an opening, or notch, in the motor shell. The other end of the motor leads are electrically connected to terminals in an external control box.

For outdoor applications, a hard molded plastic conduit, a semi-flexible metallic conduit, or a formed metal channel ("raceway") may be used to at least partially protect the segments of the motor leads which extend from the motor housing to the motor control box. More particularly, the motor leads are inserted through the conduit or into the raceway, and the conduit or raceway extends from the motor housing to the motor control box. The protective conduits and raceways add to the total motor application cost.

In addition to protecting the motor leads between the motor housing and control box, it is desirable to at least substantially cover the motor shell notch to prevent water, dirt and oil from entering into the motor housing and possibly adversely affecting motor operation. Although the conduit or raceway may cover a portion of the notch, water, dirt and oil may enter into the motor shell at the interface between the conduit or raceway and the notch.

Rather than feeding the motor leads through a notch in the motor shell, and in one known alternative construction, motor leads extend within the motor housing from the stator windings to a terminal block secured in a notch formed in the motor shell. The motor leads do not extend through the motor shell and therefore, the motor leads are fully protected within the motor housing. The terminal block mates with an external connector assembly that forms an electrical connection between the motor leads that terminate in the terminal block and external power lines. Such a "Headless" electric motor is described, for example, in Keck, U.S. Pat. No. 4,851,725, which is assigned to the present assignee.

The terminal block construction facilitates preventing water, dirt and oil from entering into the motor housing and possibly adversely affecting operation of the motor components. The terminal block construction, however, is expensive to manufacture and assemble. The material costs associated with the terminal block and external connector also are high.

Although improving protection for the motor leads and motor components is desirable, known structures, e.g., terminal block constructions, that provide such increased protection are expensive. Similarly, known structures that are less expensive to make and assemble as compared to terminal blocks, such as hard plastic conduits, provide less protection for the motor components and leads.

Accordingly, it is desirable and advantageous to reduce the manufacture and assembly costs associated with motor lead protectors as compared to the costs associated with manufacture and assembly of terminal block assemblies. It also is desirable and advantageous to improve motor component and motor lead protection as compared to the protection provided by known conduits and raceways.

An object of the present invention is to provide an inexpensive assembly for substantially preventing water, dirt and oil from passing through a motor lead notch formed in a motor shell and for protecting the motor leads for the entire lead length between the motor shell and control box.

Another object of the present invention is to provide a motor lead protection assembly that can be easily and quickly installed and is suitable for high volume manufacturing operations.

Yet another object of the present invention is to provide a motor lead protection assembly that is flexible and can be used in many motor configurations.

SUMMARY OF THE INVENTION

These and other objects may be attained with methods and apparatus for coupling a conduit to an electric motor which, in one embodiment of the apparatus, is a two-piece connector including a boss sized to be located in an end portion of a plastic, non-metallic conduit and a protective cover that substantially covers the motor shell notch at least between the boss and the motor shell notch edges. More specifically, in the one embodiment, the two-piece connector includes substantially identical first and second connector members having protective cover portions and boss portions extending from the protective cover, or flange, portions. The connecter members further include notch interfitting portions having engagement surfaces for contacting edge surfaces of the motor housing at an outer periphery of the notch.

The first and second connector members are configured to be assembled so that the respective boss portions form a boss and so that the respective protective cover portions substantially cover the motor shell notch at least between the boss and the motor shell notch edges. In one embodiment, the boss is sized so that it can be located in an end portion of a plastic, non-metallic conduit. The boss includes protuberances to provide resistance to separation of the boss from a conduit placed thereon.

To assemble the two-piece connector described above, the first connector member is inserted into the motor shell notch so that at least a portion of the engagement surface of the first connector member is in contact with the edge surface of the motor housing at an outer periphery of the notch. At least one motor lead is then laid over the first connector member so that the lead extends through the notch and over the boss portion of the first connector member.

The second connector member is then inserted into the motor shell notch so that the boss portion of the second connector member is substantially aligned with the boss portion of the first connector member. The motor endshield is secured to the motor shell, and as the motor endshield is tightened to the motor shell, the endshield and motor shell more snugly hold the two-piece connector in place.

The above described two-piece connector is relatively inexpensive to manufacture as compared to known terminal block assemblies. In addition, the connector is easy to assemble, particularly since the first and second connector members are identical and since the leads are simply laid over the lower connector member rather than having to feed the leads through a bore opening. Further, an inexpensive plastic, nonmetallic conduit can be used with such two-piece connector to even further reduce the material costs for protecting the motor leads.

The above described two-piece connector also is effective in facilitating protection of motor components and motor leads. Particularly, when the connector is secured to the motor housing and the protective conduit is pushed over the connector boss, the tight fits between the housing and the connector and between the boss and the conduit are effective in resisting the entry of water, dirt and oil into the motor housing. Such tight fits also are effective in protecting the motor leads from adverse conditions.

BRIEF DESCRIPTION OF THE DRAWINGS

FIG. 1 is a partial perspective view, with parts broken away, of an electric motor embodying the present invention in one form thereof.

FIG. 2 is a top plan view of the connector illustrated in FIG. 1.

FIG. 3 is a cross section view of the connector through line 3—3 shown in FIG. 2.

FIG. 4 is a front view of a connector member.

FIG. 5 is a top view of the connector member along line 5—5 shown in FIG. 4.

FIG. 6 is a side cross section view of the connector member shown in FIGS. 4 and 5.

FIG. 7 is an exploded cross section view of the partial thread formed on the connector member shown in FIGS. 4, 5 and 6.

DETAILED DESCRIPTION

FIG. 1 is a partial perspective view, with parts broken away, of an electric motor 10 and a two-piece connector 12 in accordance with one embodiment of the present invention. Motor 10 includes a motor shell 14 having a first end 16 and an endshield (not shown) for closing first end 16 of shell 14. Motor shell 14 and the endshield at least partially form a motor housing, and stator and rotor assemblies (not shown) are located in the motor housing.

A notch 18 is formed in motor shell 14 and connector 12 is located in notch 18. Notch 18 has an open end and a portion of the endshield (not shown) closes the open end of notch 18 when assembled to motor shell 14.

Connector 12 includes a first connector member 20 having a substantially rectangular shaped protective cover, or flange, portion 22 and a boss portion 24 extending from cover portion 22. First connecter member 20 further includes an engagement surface (not shown in FIG. 1) for contacting an edge surface of motor shell 14 at an outer periphery of notch 18. First connector member 20 also includes a backing portion 26 that forms a notch interfitting portion, or groove, 28 along the periphery of first connector member 20 for receiving a portion of motor shell 14.

Connector 12 further includes a second connector member 30 which is substantially identical to first connector member 20. Particularly, second connector member 30 includes having a protective cover, or flange, portion 32 and a boss portion 34 extending from protective cover portion 32. Second connector member 30 further includes an engagement surface (not shown in FIG. 1) for contacting an edge surface of the motor endshield at an outer periphery of notch 18. Second connector member 30 also includes a backing portion 36 that forms a notch interfitting portion, or groove, 38 along the periphery of second connector member 30 for receiving a portion of motor shell 14.

First and second connector members 20 and 30 are assembled so that respective boss portions 24 and 34 form a boss 40 having an opening 42 extending therethrough. Motor leads 44A, 44B and 44C, having respective terminal clips 46A, 46B and 46C on one end thereof, extend through boss opening 42. Leads 44A, 44B and 44C are connected, at their other ends, to stator windings (not shown) located inside the motor housing. Leads 44A, 44B and 44C are to be inserted into an external conduit 48 having a passage 50. One end 52 of conduit 48 is pushed over boss 40 so that boss 40 is substantially located inside conduit 48. The end of boss 40 may be chamfered to facilitate pushing conduit 48 over boss 40.

First and second boss portions 24 and 34 each have at least one protuberance 54 and 56, respectively, to provide resistance to separation of boss 40 from conduit 48, even at elevated operating temperatures. Specifically, the contraction forces of conduit 48 against boss 40 and friction forces created between partial threads 54 and 56 and conduit 48 firmly maintain conduit 48 over boss 40. Protuberances 54 and 56 are illustrated in FIG. 1 as being partial threads, however, protuberances 54 and 56 could have many other forms including machine elements such as ridges, rings, and barbs.

To protect the internal motor components, e.g., the stator and rotor assemblies, from water, dirt and oil, respective protective cover, or flange, portions 22 and 32 substantially cover motor shell notch 18 at least between boss 40 and the motor shell notch edges. As shown in FIG. 1, portions 22 and 32 extend beyond the notch edges to assist in maintaining connector 12 in position. Boss 40 and conduit 48 also assist, when engaged, in preventing water, dirt and oil from entering into the motor housing.

First and second connector members 20 and 30, in the one form illustrated in FIG. 1, are formed by injection molding using a plastic or polyester resin such as Valox DR51 or Valox 325 polyester resins, available from GE Plastics, One Plastic Avenue, Pittsfield, MA, 01201 ("Valox" is a registered trademark of General Electric Company). Conduit 48 can be, for example, flexible Carflex conduit commercially available from Carlon, 25701 Science Park Drive, Cleveland, Ohio 44122 or flexible Liqua-tite conduit commercially available from Electri-flex Company, 222 West Central Avenue, Roselle, Ill. 60172. Conduit 48 can be pre-cut so that conduit 48 has a length about equal to the distance from boss 40 to the motor control box. By protecting motor leads 44A–44C along the entire lead length between connector 12 and the control box, the motor cost can be reduced by using thinner lead insulation.

FIG. 2 is a top plan view of connector 12. As shown in FIG. 2, second connector member 30 includes engagement surface 58 for contacting an edge surface of the motor housing, e.g., an edge surface of an endshield, at an outer periphery of notch 18. Crushable projections 60A, 60B, 60C and 60D of engagement surface 58 facilitate maintaining connector 12 in tight engagement with the motor housing as hereinafter described.

Stabilization members 62 and 64 which extend from respective surfaces of first and second connector members 20 and 30 also are shown in FIG. 2. Stabilization members 62 and 64, which are described hereinbelow in more detail, are inserted into respective stabilization member receptacles 66 and 68 formed in the opposing connector member surface (not shown in FIG. 2).

With respect to cover portions 22 and 32 (only cover portion 32 is visible in FIG. 2), such portions 22 and 32 are curved so as to facilitate surface to surface contact with the motor shell. This surface to surface contact even further facilitates resisting the entrance of water, dirt and oil into the motor housing.

FIG. 3 is a cross section view of connector 12 through line 3—3 shown in FIG. 2. As shown in FIG. 3, first connector member 20 includes an engagement surface 70 for contacting an edge surface of the motor housing at an outer periphery of notch 18. Crushable projections (not shown in FIG. 3) on first engagement surface 70 facilitate maintaining connector 12 in tight engagement with the motor housing as hereinafter described.

As also shown in FIG. 3, boss opening 42 extends through connector 12. Such opening 42 is sized so that motor leads 44A, 44B and 44C can easily extend therethrough.

To ease manufacturing requirements, and keep costs low, first and second connector members 20 and 30 are substantially identical. Therefore, in manufacturing connector members 20 and 30, there is no need to keep such members 20 and 30 separate and such members 20 and 30 can be formed using the same tooling. This identical construction of members 20 and 30 facilitates reducing labor and tooling costs associated with manufacturing connector members 20 and 30 and also simplifies assembly of members 20 and 30.

FIG. 4 is a front view of first connector member 20. Since first connector member 20 is identical to second connector member 30, as explained the above, the following description of first connector member 20 also describes second connector member 30.

As clearly shown in FIG. 4, first connector member 20 includes stabilization member, or tab, 62 and stabilization member receptacle 68. Tab 62 and receptacle 68 mate with opposing receptacle 66 and tab 64 of second connector member 30 as described above. Tab 62 and receptacle 68 facilitate stabilizing connector 12 (FIG. 1) and provide further resistance to prevent moisture from entering into the motor housing.

Also shown in FIG. 4, in phantom, are crushable projections 72A, 72B, 72C and 72D of first engagement surface 70. Further, boss portion 24 forms a channel 74. When first connector member 20 and second connector member 30 are assembled, channel 74 and a similar channel (not shown) formed by boss 34 of second connector member 30 form opening or passage 42 (FIGS. 1, 2 and 3).

FIG. 5 is a top view of the connector member 20 along line 5—5 shown in FIG. 4. As clearly shown in FIG. 5, substantially rectangular shaped protective cover portion 22 and backing portion 26 form notch interfitting portion, or groove, 28 along the periphery of first connector member 20. Groove 28 is sized for receiving portions of motor shell 14. By inserting portions of motor shell 14 into groove 28, cover portion 22 is more effective in resisting the entry of water, dirt and oil into the motor housing.

FIG. 6 is a side cross section view of first connector member 20. The relative elevations of cover portion 22, engagement surface 70, and backing portion 36 are clearly shown in FIG. 6. Specifically, when oriented as shown in FIG. 6, cover portion 22 extends above engagement surface 70. Since a portion of the motor housing is in firm contact with surface 70 when connector member 20 is secured to the motor housing, cover portion 22 extends over the interface between the motor housing and fitting 12 (FIG. 1). By extending over such interface, cover portion 22 is more effective in resisting the entrance of water, dirt and oil into the motor housing.

Also, the wall of boss portion 24 is sufficiently thick, e.g., about 0.096 inches in one embodiment, so that boss portion 24 is less susceptible to breaking off when subjected to significant external forces. Such a construction substantially eliminates nuisance breakage that may occur when pushing conduit 48 (FIG. 1) over boss 40.

FIG. 7 is an exploded cross section view of one exemplary construction for partial thread 54 formed on first connector member 20 shown in FIGS. 4, 5 and 6. Partial thread 54, as shown in FIG. 6, is formed by a first surface 76 that extends at about a 30° angle from a substantially planar surface 78 of boss portion 24 and a second surface 80 that is substantially perpendicular to planar surface 78. The distance from the intersection of first and second surfaces 76 and 80, i.e., the tip of thread 54, to planar surface 78, in one embodiment, is about 0.025 inches.

Partial thread 54 as described above is configured to enable conduit 48 (FIG. 1) to be easily pushed over, or twisted onto, boss portion 24 during assembly. Partial thread 54 also is configured to provide resistance to separation of boss 40 from conduit 48 (FIG. 1). As explained above, partial thread 54 could be replaced by many other machine elements such as ridges, rings, and barbs. Partial thread 54 is particularly well-suited for a high volume manufacturing process because workers can easily and simply push, and possibly slightly twist, conduit 48 over thread 54 without requiring any full twisting motion.

Set forth below is a description of one method for assembling connector 12 and securing connector 12 to the motor housing 10. Specifically, first connector member 20 is located in motor shell notch 18 so that at least a portion of first engagement surface 70, e.g., crushable projections 72A, 72B, 72C and 72D, is in contact with the edge surface of motor housing 10 at an outer periphery, i.e., the bottom of notch 18. Also, notch edge surfaces are located in groove 28.

With first connector member 20 positioned in notch 18 as described above, motor leads 44A, 44B and 44C are laid over first connector member 20 so that leads 44A, 44B and 44C extend through notch 18 and over channel 74 of boss portion 24. Once motor leads 44A, 44B and 44C are in the position described above, second connector member 30 is inserted into motor shell notch 18 over first connector member 20 so that boss portion 34 of second connector member 30 is substantially aligned with boss portion 24 of first connector member 20. Also, second connector member 20 is aligned with first connector member 20 so that stabilization members 62 and 64 are aligned with, and inserted into, respective stabilization receptacles 66 and 68.

The motor endshield is then secured, e.g., using threaded bolts, to motor shell 14. As the motor endshield is tightened against shell 14, a portion of the motor endshield contacts engagement surface 58 (FIG. 2) including crushable projections 60A, 60B, 60C and 60D of second connector member 30. The force of the motor endshield against crushable projections 60A, 60B, 60C and 60D also causes first contact surface 70 including crushable projections 72A, 72B, 72C and 72D to be more firmly, or snugly, in contact with the edge surfaces of notch 18. Once the motor endshield is fully secured to shell 14, connector 12 is firmly trapped in notch 18 by edge surfaces of motor shell 14 and the motor endshield.

Motor leads 44A, 44B and 44C can then be at least partially inserted through conduit 48 and one end 52 of conduit 48 is pushed over boss 40, including over partial threads 54 and 56. Boss 40 therefore is located within an end portion of conduit 48, and the tight fit between conduit 48 and first and second boss portions 24 and 34 facilitates retaining boss portions 24 and 34 aligned.

Two-piece connector 12 described above is relatively inexpensive to manufacture as compared to known terminal block assemblies. In addition, connector 12 is easy to assemble, particularly since first and second connector members 20 and 30 are substantially identical and since motor leads 44A, 44B and 44C are simply laid over first connector member 20 rather than having to feed, or thread, the leads through a bore opening.

Further, inexpensive plastic, non-metallic conduit 48 can be used with such two-piece connector 12 to even further reduce the material costs. Also, if conduit 48 extends along the entire lead length between motor shell 14 and the motor control box, thinner lead insulation, e.g., 3/64" rather than 4/64", may be used with the motor leads. Using thinner lead insulation, of course, reduces motor costs.

Connector 12 also is effective in facilitating protection of the motor components and motor leads 44A, 44B and 44C. Particularly, when connector 12 is secured to the motor housing and connector boss 40 is substantially located in protective conduit 48, the tight fits between the housing and connector 12 and between boss 40 and conduit 48 are effective in resisting the entry of water, dirt and oil into the motor housing. Such tight fits also are effective in protecting motor leads 44A, 44B and 44C from adverse conditions. In addition, connector 12 also protects motor leads 44A, 44B and 44C from abrasion by trapping leads 44A, 44B and 44C substantially in a set position.

From the preceding description, it is evident that the objects of the invention are attained. Although the invention has been described and illustrated in detail, it is to be clearly understood that the same is intended by way of illustration and example only and is not to be taken by way of limitation. For example, boss 40 could be slightly tapered to facilitate pushing conduit 48 over boss 40. Moreover, rather than pushing conduit 48 over boss 40, it is possible to size conduit 48 and boss 40 so that conduit 48 could be inserted into boss 40. In addition, connector 12 could be manufactured from a variety of insulating materials such as hard rubber and is not necessarily limited to being manufactured from plastic. Accordingly, the spirit and scope of the invention are to be limited only by the terms of the appended claims.

What is claimed is:

1. A connector for coupling a conduit to an electric motor, the motor including a motor shell having a first end and an endshield for closing the first end of the shell, the motor shell and endshield at least partially forming a motor housing, a stator assembly located in the motor housing and at least one motor lead extending from the stator assembly, a notch formed in the motor shell so that the motor lead can extend therethrough, the notch having an open end and a portion of the endshield closing the open end of the notch when assembled to the motor shell, said connector comprising:

a first connector member comprising a protective cover portion and a boss portion extending from said protective cover portion, said first connecter member further comprising a notch interfitting portion including an engagement surface for contacting an edge surface of the motor housing at an outer periphery of the notch formed therein;

a second connector member comprising a protective cover portion and a boss portion extending from said protective cover portion, said second connecter member further comprising a notch interfitting portion including an engagement surface for contacting an edge surface of the motor housing at an outer periphery of the notch formed therein; and said first and second connector members totally separable from each other and configured to be assembled in the motor shell notch so that said boss portions form a boss and so that said protective cover portions substantially cover the motor shell notch at least between said boss and the motor shell notch edges.

2. A connector for coupling a conduit to an electric motor in accordance with claim 1 further comprising crushable projections on said engagement surface of said first connector member.

3. A connector for coupling a conduit to an electric motor in accordance with claim 1 further comprising crushable projections on said engagement surface of said second connector member.

4. A connector for coupling a conduit to an electric motor in accordance with claim 1 wherein said boss portion of said first connector member has at least one protuberance to provide resistance to separation from a conduit placed thereon.

5. A connector for coupling a conduit to an electric motor in accordance with claim 1 wherein said boss portion of said second connector member has at least one protuberance to provide resistance to separation from a conduit placed thereon.

6. A connector for coupling a conduit to an electric motor in accordance with claim 1 wherein said boss portions of said first and second connector members have at least one protuberance to provide resistance to separation from a conduit placed thereon.

7. A connector for coupling a conduit to an electric motor in accordance with claim 6 wherein at least one protuberance is a machine element selected from the group consisting of partial threads, ridges, rings, and barbs.

8. A connector for coupling a conduit to an electric motor in accordance with claim 1 wherein said boss formed by said boss portions is sized to be located in one end of the conduit.

9. A connector for coupling a conduit to an electric motor in accordance with claim 1 further comprising a stabilization member extending from a surface of said first connector member.

10. A connector for coupling a conduit to an electric motor in accordance with claim 9 further comprising a stabilization member receptacle formed in said second connector member, said stabilization member at least being partially positioned in said stabilization member receptacle when said first and second connector members are aligned and assembled into the motor shell notch.

11. A connector for coupling a conduit to an electric motor in accordance with claim 1 wherein the conduit is a plastic, non-metallic conduit and said boss is sized to be located within a portion of the conduit, the conduit cooperating with said boss portions to retain said boss portions therein.

12. A connector for coupling a conduit to an electric motor, the motor including a motor shell having a first end and an endshield for closing the first end of the shell, the motor shell and endshield at least partially forming a motor housing, a stator assembly located in the motor housing and at least one motor lead extending from the stator assembly, a notch formed in the motor shell so that the motor lead can extend therethrough, the notch having an open end and a portion of the endshield closing the open end of the notch when assembled to the motor shell, said connector comprising a first connector member and a second connector member totally separable from each other, said first connector member comprising a protective cover portion forming a partial notch protective cover and a boss portion extending from said protective cover portion and forming a portion of a boss, said first connector member further comprising a notch interfitting portion including an engagement surface for contacting an edge surface of the motor housing at an outer periphery of the notch formed therein.

13. A connector for coupling a conduit to an electric motor in accordance with claim 12 wherein crushable projections are disposed on said engagement surface of said first connector member.

14. A connector for coupling a conduit to an electric motor in accordance with claim 12 wherein said boss portion has at least one protuberance to provide resistance to separation from a conduit placed thereon.

15. A connector for coupling a conduit to an electric motor in accordance with claim 12 further comprising a stabilization member extending from a surface of said first connector member.

16. A connector for coupling a conduit to an electric motor in accordance with claim 15 further comprising a stabilization member receptacle formed in said first connector member.

17. A connector for coupling a conduit to an electric motor in accordance with claim 12 wherein said second connector member comprises a protective cover portion and a boss portion extending from said protective cover portion, said second connecter member further comprising a notch interfitting portion including an engagement surface for contacting an edge surface of the motor housing at an outer periphery of the notch formed therein, said first and second connector members configured to be assembled in the motor shell notch so that said boss portions form a boss and so that said protective cover portions substantially cover the motor shell notch at least between said boss and the motor shell notch edges.

18. A connector for coupling a conduit to an electric motor in accordance with claim 17 wherein crushable projections are disposed on said engagement surface of said second connector member.

19. A connector for coupling a conduit to an electric motor in accordance with claim 17 wherein said boss portion of said second connector member has at least one protuberance to provide resistance to separation from a conduit placed thereon.

20. A connector for coupling a conduit to an electric motor in accordance with claim 17 wherein said boss portions of said first and second connector members have at least one protuberance to provide resistance to separation from a conduit placed thereon.

21. A connector for coupling a conduit to an electric motor in accordance with claim 20 wherein at least one protuberance is a machine element selected from the group consisting of partial threads, ridges, rings, and barbs.

22. A connector for coupling a conduit to an electric motor in accordance with claim 17 wherein said boss formed by said boss portions is sized to be located in one end of the conduit.

23. A connector for coupling a conduit to an electric motor in accordance with claim 22 wherein the conduit is a plastic, non-metallic conduit and said boss is sized to be located within a portion of the conduit, the conduit cooperating with said first and second boss portions to retain said boss portions therein.

24. A method for assembling a connector for coupling a conduit to an electric motor, the motor including a motor shell having a first end and an endshield for closing the first end of the shell, the motor shell and endshield at least partially forming a motor housing, a stator assembly located in the motor housing and at least one motor lead extending from the stator assembly, a notch formed in the motor shell so that the motor lead can extend therethrough, the notch having an open end and a portion of the endshield closing the open end of the notch when assembled to the motor shell, the connector including first and second connector members, the first and second connector members each including a protective cover portion and a boss portion extending from the protective cover portion, the connector members further including a notch interfitting portion including an engagement surface for contacting an edge surface of the motor housing at an outer periphery of the notch formed therein, said method comprising the steps of:

inserting the first connector member into the motor shell notch so that at least a portion of the engagement surface of the first connector member is in contact with the edge surface of the motor housing at an outer periphery of the notch;

laying at least one motor lead over the first connector member so that the lead extends through the notch and over the boss portion of the first connector member; and inserting the second connector member into the motor shell notch so that the boss portion of the second connector member is substantially aligned with the boss portion of the first connector member.

25. A method for assembling a connector in accordance with claim 24 wherein the engagement surface of the first connector member includes crushable projections and wherein the crushable projections are in contact with the edge surface of the motor housing at an outer periphery of the notch.

26. A method for assembling a connector in accordance with claim 24 wherein the boss portions of the first and second connector members form a boss and wherein said method further comprises the steps of:

inserting the motor lead at least partially through the conduit; and forcing an end portion of the conduit over at least a portion of the boss.

27. A method for assembling a connector in accordance with claim 24 wherein a stabilization member extends from a surface of the first connector member and a stabilization receptacle is formed in the second connector member, and wherein the step of inserting the second connector member into the motor shell notch so that the boss portion of the second connector member is substantially aligned with the boss portion of the first connector member comprises the steps of:

aligning the stabilization member with the stabilization receptacle; and inserting the stabilization member into the stabilization receptacle.

28. A dynamoelectric machine comprising a shell having a first end and an endshield for closing the first end of said shell, said shell and said endshield at least partially forming a housing, a stator assembly located in said housing and at least one lead extending from said stator assembly, a notch formed in said motor shell so that said lead can extend therethrough, said notch having an open end and a portion of said endshield closing said open end of said notch when assembled to said shell, a connector comprising a first connector member comprising a protective cover portion and a boss portion extending from said protective cover portion, said first connector member further comprising a notch interfitting portion including an engagement surface for contacting an edge surface of said motor housing at an outer periphery of said notch formed therein, a second connector member comprising a protective cover portion and a boss portion extending from said protective cover portion, said second connecter member further comprising a notch interfitting portion including an engagement surface for contacting an edge surface of said motor housing at an outer periphery of said notch formed therein, said first and second connector members totally separable from each other and configured to be assembled in the motor shell notch so that said first and second boss portions form a boss and so that said protective cover portions substantially cover said motor shell notch at least between said boss and said motor shell notch edges.

29. A dynamoelectric machine in accordance with claim 28 wherein said boss portion of said first connector member has at least one protuberance to provide resistance to separation from a conduit placed thereon.

30. A dynamoelectric machine in accordance with claim 28 wherein said boss portion of said second connector member has at least one protuberance to provide resistance to separation from a conduit placed thereon.

31. A dynamoelectric machine in accordance with claim 30 wherein at least one protuberance is a machine element selected from the group consisting of partial threads, ridges, rings, and barbs.

32. A dynamoelectric machine in accordance with claim 28 wherein said boss is sized to be at least partially located in one end of the conduit.

33. A dynamoelectric machine in accordance with claim 28 further comprising a stabilization member extending from a surface of said first connector member.

34. A dynamoelectric machine in accordance with claim 33 further comprising a stabilization member receptacle formed in said second connector member, said stabilization member at least being partially positioned in said stabilization member receptacle when said first and second connector members are aligned and assembled into said motor shell notch.

35. A dynamoelectric machine in accordance with claim 28 wherein the conduit is a plastic, non-metallic conduit and said boss is sized to be at least partially located within a portion of the conduit.

36. A two-piece connector for coupling a conduit to a housing, said connector comprising first and second connector members totally separable from each other, each of said first and second connector members having a protective cover portion and a boss portion extending from said protective cover portion, each of said first and second connector members further having a notch interfitting portion and an engagement surface for contacting an edge surface of the housing at an outer periphery of a notch formed therein.

37. A two-piece connector in accordance with claim 36 wherein said first and second connector members are substantially identical to one another.

38. A two-piece connector in accordance with claim 36 wherein said boss portions of said first and second connector members form a boss sized to be at least partially located in an end portion of the conduit.

39. A two-piece connector in accordance with claim 38 wherein at least one of said boss portions has a protuberance thereon to provide resistance to separation from a conduit placed thereon.

40. A two-piece connector in accordance with claim 36 wherein said protective cover portions of said first and second connector members are sized to substantially cover the housing notch at least from said boss to the notch edges.

41. A two-piece connector in accordance with claim 36 wherein at least one of said engagement surfaces of said first and second connector members has crushable projections thereon.

42. A two-piece connector in accordance with claim 36 further comprising a stabilization member extending from a surface of said first connector member and a stabilization member receptacle formed in said first connector member.

* * * * *